TRANSMISSION MEASURING SYSTEM

Filed Dec. 18, 1958 3 Sheets-Sheet 1

INVENTORS T. F. BENEWICZ
A. E. RUPPEL
BY J. P. Kearns, Jr.
ATTORNEY

Sept. 20, 1960 T. F. BENEWICZ ET AL 2,953,632

TRANSMISSION MEASURING SYSTEM

Filed Dec. 18, 1958 3 Sheets-Sheet 2

INVENTORS T. F. BENEWICZ
A. E. RUPPEL
BY
J. P. Kearns, Jr.
ATTORNEY

INVENTORS T. F. BENEWICZ
A. E. RUPPEL
BY J. P. Kearns, Jr.
ATTORNEY

United States Patent Office 2,953,632

Patented Sept. 20, 1960

2,953,632

TRANSMISSION MEASURING SYSTEM

Thomas F. Benewicz, Fort Lee, N.J., and Alfred E. Ruppel, East Rockaway, N.Y., assignors to Bell Telephone Laboratories, Incorporated, New York, N.Y., a corporation of New York Filed Dec. 18, 1958, Ser. No. 781,359

5 Claims. (Cl. 178—5)

Figure 1:
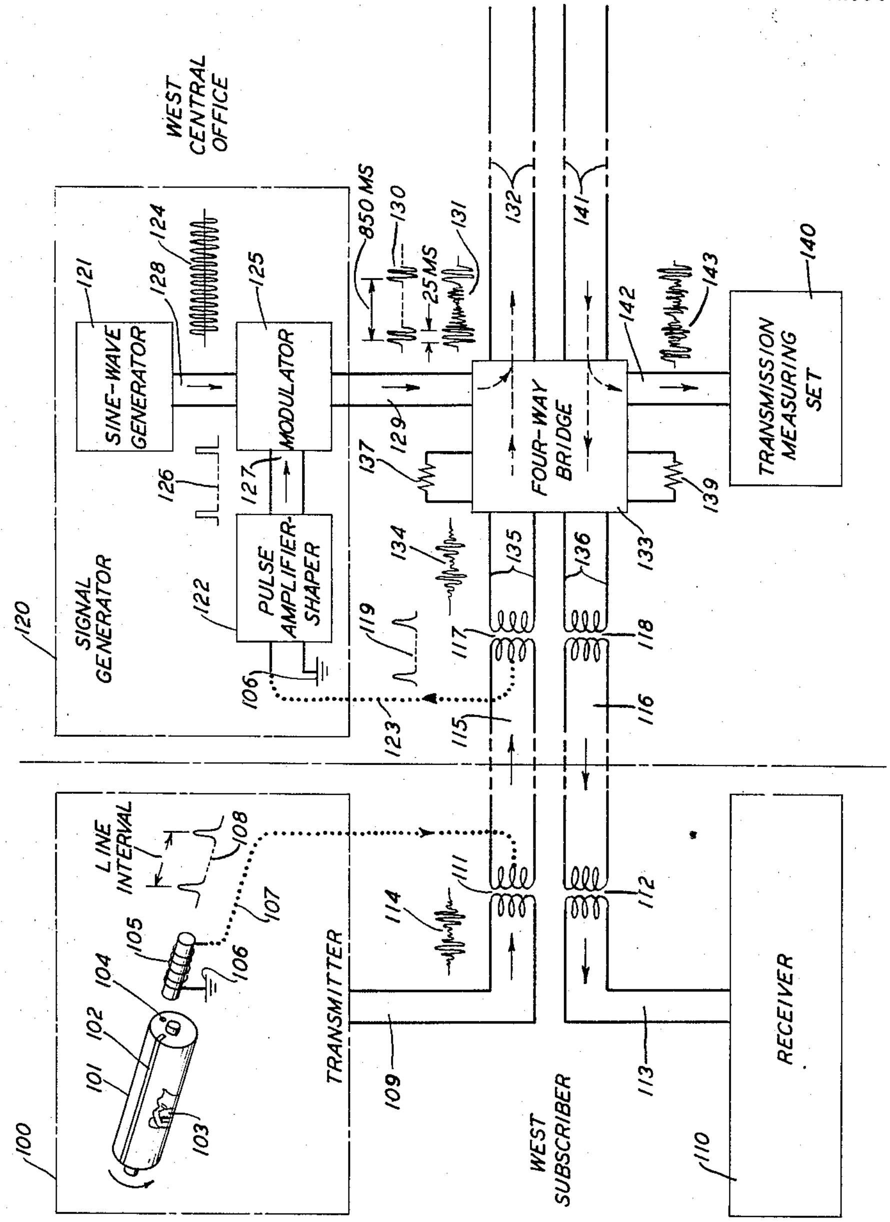

This invention relates to electrical measuring systems and more specifically to a system for the precise measurement of transmission net loss in a working facsimile or telephotograph transmission network.

The most frequently reported trouble on telephotograph networks linking newspaper service bureaus distributed among principal cities from coast to coast in the United States and Canada, for example, is due to intermittent changes in transmission net loss or transmission level. Since the networks are in general built up of many tandem and branching transmission links, it is a difficult and time-consuming procedure to locate the particular link in which the intermittent changes in level are occurring. With the measuring systems currently employed, it is generally necessary to remove the suspected transmission link from service while it is being tested for the trouble condition. This is manifestly undesirable.

Changes in transmission net loss in amplitude-modulated systems result in degradations in the received telephotograph copy which appear as light or dark bars of varying duration depending on whether the level change is in a positive or negative direction and upon the nature of the picture material. In telephotograph receiving equipment employing up to a 30-decibel contrast range, level changes as small as 0.25 decibel produce detectable degradation in the received picture. Net loss changes greater than 0.4 decibel begin to produce objectionable distortion in the received picture.

In-service photographic and magnetic tape monitoring of the full transmitted signal have been employed for the purpose of producing a record of transmission irregularities. Both these monitoring systems suffer from the disadvantages of being relatively expensive, of not producing an immediately observable indication of a transmission irregularity and further of not producing a precise quantitative indication of level change. The photographic monitor requires developing, a process which may take from five minutes to an hour in the aggregate depending on the number of individual pictures involved before the degraded picture is processed. The magnetic tape requires playback. Both systems then require interpretation by a trained operator to translate the irregularities noted into decibels of transmission net loss.

Another possible in-service monitoring system makes use of the picture carrier itself. This system requires increasing the amplitude of the carrier during the clamp-bar interval so that it might be separated from the normal picture signal for amplitude level detection. In order, however, to avoid overloading the transmission facilities, effectively the normal carrier must be reduced, thereby producing the disadvantage of reducing the signal-to-noise ratio in the normal picture signal. It is therefore evident that these systems of in-service monitoring are not entirely satisfactory.

Accordingly, it is an object of this invention to simplify in-service transmission measurement of the variation in transmission net loss on amplitude-modulated telephotograph networks for maintenance purposes.

It is another object of this invention to obtain concurrent and immediately readable quantitative indications of transmission efficiency in telephotograph networks without interference with picture transmission.

It is a further object of this invention to make practicable the location of transmission level changes of an intermittent nature on an in-service basis, i.e., during picture tranmission, in a telephotograph network.

According to this invention, a burst of tone of a frequency lying outside the picture transmission band is inserted at a controlled level during the so-called clamp-bar intervals at the ends of picture-scanning lines and is transmitted along with the picture signal over the telephotograph transmission network. At terminating and intermediate points in a transmission network the tone burst is separated from the picture signal per se and measured on a peak-reading electron tube voltmeter or recorded by graphic means on a strip chart. By simultaneous observation of the level of the tone bursts at the terminating and intermediate points the transmission link in which sudden level changes occur is readily identified without the necessity for link-by-link measurements or for removing a suspected link from service. Moreover, a numerical indication of transmission net loss is immediately available without the need for subjective interpretation.

A feature of the invention is that readings of transmission net loss on a working telephotograph transmission system are obtainable at an accuracy of $\pm 0.25$ decible, well within the range of objectionable picture degradation.

Figure 2:
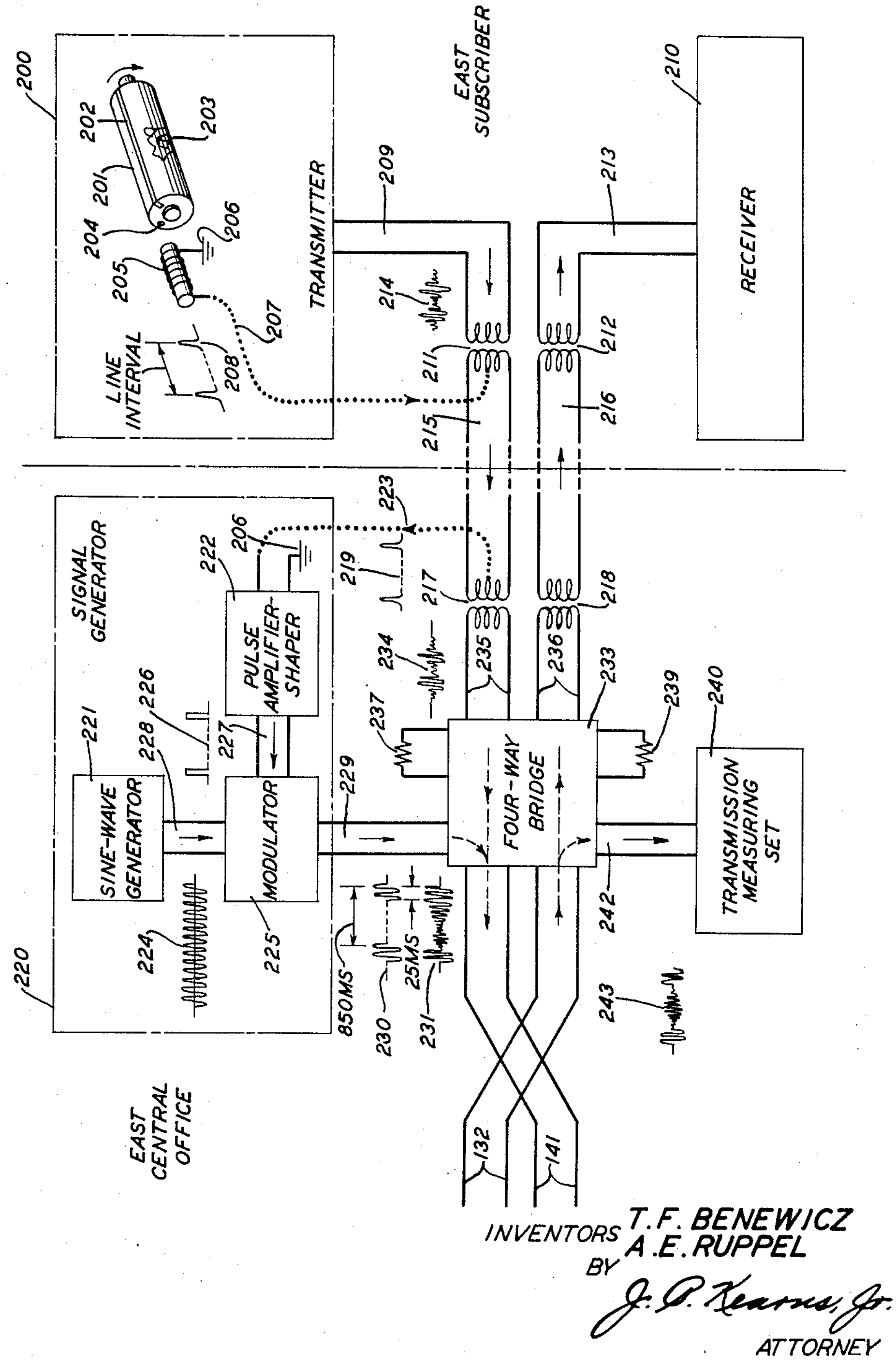
Figure 3:
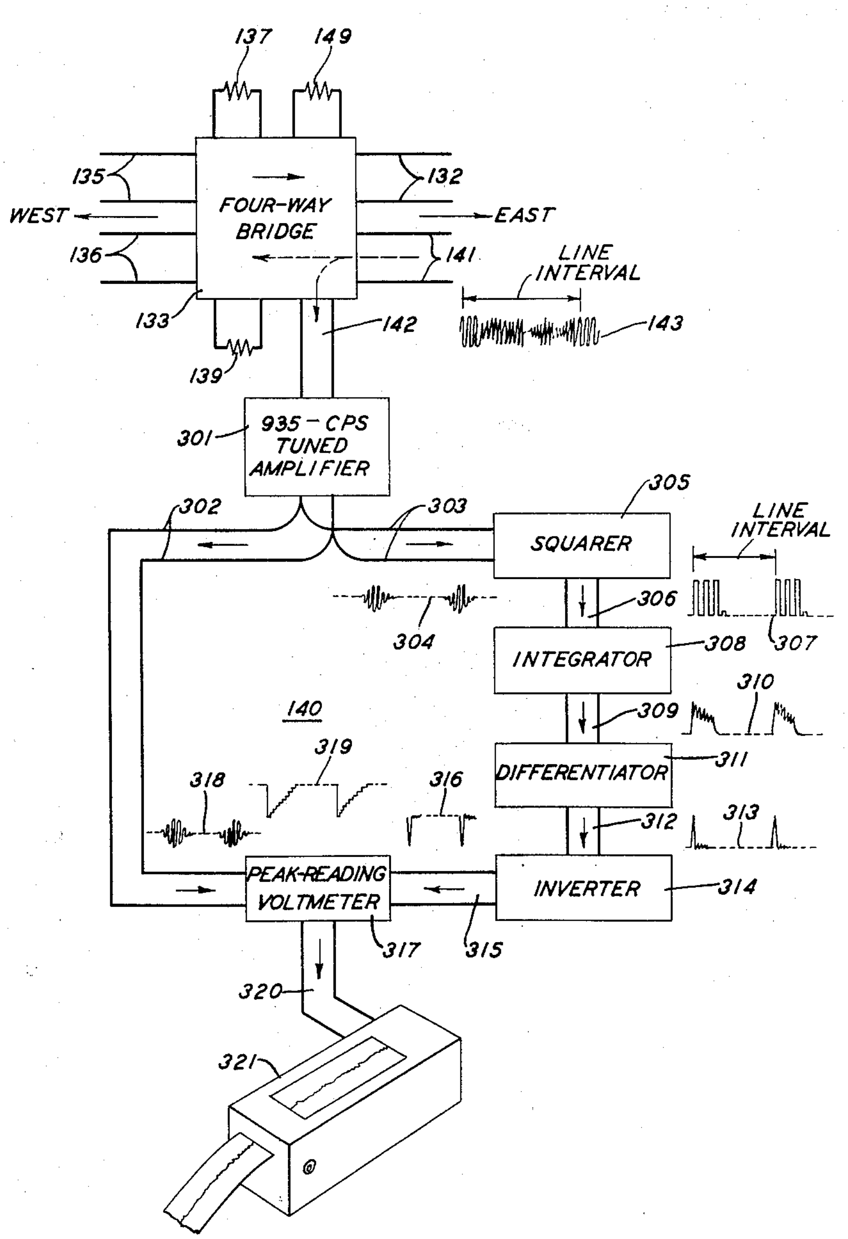

A fuller understanding and appreciation of the invention will be had from the following detailed description and by reference to the drawing, in which:

Figs. 1 and 2 are a diagrammatic representation of a telephotograph transmission system including west and east terminating offices, respectively, and showing the location of measuring apparatus according to this invention; and Fig. 3 is a diagram of the circuits of a transmission measuring apparatus according to the invention.

The telephotograph system to which this invention relates is of the amplitude-modulated type more fully described by F. W. Reynolds in "A New Telephotograph System" published in the Bell System Technical Journal at page 549 of volume XV. However, it will readily be realized from the following description that the invention is as well applicable to other types of facsimile systems and also to digital tranmission systems in general.

Figs. 1 and 2 taken together show a single transmission link in an amplitude-modulated telephotograph transmission system of the type described in the above-mentioned Reynolds' article and is a system to which the measuring apparatus of this invention is particularly applicable. A west terminating office and an east terminating office for the telephotograph transmission system are shown in Figs. 1 and 2 respectively, linked by a two-way four-wire transmission line comprising west-to-east path 132 and east-to-west path 141. Although the transmission links shown here are cable pairs or open-wire lines, it will be understood that they could equally well represent separate channels in a wire or radio carrier system. The east and west central offices are stations at which one or more of a plurality of subscribers may be connected to the transmission system.

It will be understood that in a practical telephotograph transmission network transmission lines may branch out in several different directions from a given central office. Terminating offices only are described here for the sake of simplicity.

Each of the west and east subscribers is connected to its serving central office by means of a subscriber loop. Separate loops are used for the transmitting and receiving paths as shown. Each of the east and west subscribers is provided with a transmitter and a receiver connected to the separate loops. The transmitter 100 of the west subscriber is connected to the loop 115 through lines 109 and repeater coil 111. The receiver 110 for the west subscriber is also connected to the west central office over loop 116 by way of lines 113 and repeater coil 112. Repeater coils 111 and 112 are employed to isolate the transmitters and receivers from direct current. The east subscriber is similarly equipped with a transmitter 200 and a receiver 210 which are linked to the east central office by loops 215 and 216, respectively. The transmitting and receiving apparatus at the east and west subscribers' locations are substantially the same, and corresponding elements are designated by similar characters—those of the west subscriber being in the 100 series and those of the east subscriber, in the 200 series.

In the system shown in Figs. 1 and 2 the west subscriber may transmit a picture from his transmitter 100 through the west central office, over transmitting pair 132, through the east central office to the receiver 210 at the east subscriber's location over loop 216. At the same time the east subscriber without interference may transmit a picture from transmitter 200 over loop 215 through the east central office, over lines 141 to the west central office and thence over loop 116 to the receiver 110 at the west subscriber's location. However, where intermediate stations connect to the same transmission line, simultaneous transmission and reception is not normally employed because interference would arise at the intermediate centers, although not at terminating offices.

The manner in which a picture is transmitted from one subscriber location to another is well known and does not form a part of this invention. The receiver apparatus at both subscriber locations is indicated only by a block because no modification of this apparatus is necessary in order to practice this invention.

The transmitter 100 at the west subscriber's location comprises a rotating drum 101 upon which the pictorial matter 103 is clamped by means of a clamp-bar 102. The scanning means is not shown in the drawing but it is understood that a conventional optical scanning system is employed. Pictures may be scanned, for example in a practical system, by reflected light at 100 lines per inch with a velocity of 20 inches per second. The drum 101 is rotated at such a speed, therefore, that one line is scanned in about 850 milliseconds. However, the clamp-bar 102 is usually given a dark finish so that as the clamp-bar passes under the light source no information is transmitted. During the time that the clamp-bar is passing under the light source a vacant time interval of about 50 milliseconds is available in which to insert special signals for level control or synchronizing purposes.

Inasmuch as the telephotograph system described by Reynolds does not use this so-called clamp-bar interval for synchronizing purposes or otherwise, this interval is employed to insert a pulse from which transmission level measurements may be made. In normal operation the picture information generated during the available line time (scanning interval less the clamp-bar interval) is transmitted over lines 109 and through repeater coil 111 to the subscriber's loop 115. At the west central office the picture signal is transmitted over line 132 which connects to another central office. In the usual private line system switching is not generally employed at the central office, each subscriber having the exclusive use of a particular transmission line.

In some facsimile transmission systems a flat-bed scanner rather than a rotary drum is employed. In these systems, however, there is available an unused time interval at the end of each scanning line corresponding to the clamp-bar interval. This invention is therefore readily adaptable to flat-bed scanning systems.

In order to generate a pulse during the clamp-bar interval an arrangement such as shown in Fig. 1 may be employed. In this arrangement a permanent magnet 104 is affixed to one end of the rotating drum 101 and a magnetic pickup coil 105 is so placed with respect to the drum that on each rotation a small voltage is induced across the coil 105. One end of the coil 105 is connected to ground at point 106 and the other end of the coil is connected by means of an auxiliary lead 107 to a center tap on the secondary winding of repeater coil 111. This impulse is transmitted by simplex means longitudinally over the subscriber loop 115 to a corresponding center tapped repeater coil 117 in the west central office.

It will be understood that the pulse generating arrangement shown in Fig. 1 is only one of several means by which such a pulse may be generated. It could, for example, also be generated by a cam-driven switch located on the end of the rotating drum 101. Another arrangement might be to use an auxiliary photocell which would generate an impulse by reflected light directly from a specially provided bright portion on the clamp-bar itself. However, the means shown in Fig. 1 appears to be particularly favorable from the standpoint of economy of equipment and also from the standpoint that no additional load would be placed on the rotating drum driving motor. Waveform 108 within the block 100 indicates the general form of the pulse generated.

Corresponding pulse generating arrangements may readily be devised for flat-bed scanning systems.

At the east central office the same pulse generating arrangement is shown and may be identified by the corresponding designators employed. For example, the east subscriber in Fig. 2 is provided with a transmitter 200 and a receiver 210. Transmitter 200 comprises rotating drum 201, including clamp-bar 202, magnet 204 and pictorial subject matter 203 clamped thereto; and pickup coil 205, having a ground at point 206 and a wire connection 207 to repeating coil 211. Pulse waveform 208 is generated by coil 205 whenever magnet 204 rotates in line with its core. A picture signal 214 is transmitted over line 209 and repeating coil 211 to loop 215.

At the west central office certain auxiliary equipment necessary to the practice of this invention is shown by the signal generator 120 and the transmission measuring set 140. The signal generator 120 provides a means by which an alternating-current signal for measuring purposes may be generated to coincide with the pulse generated at the subsecriber's transmitter. The signal generator 120 comprises a continuously operating sine-wave generator 121, a pulse amplifier and shaper 122 and a modulator 125.

The sine-wave generator 121 may be of any conventional type, such as a Wien bridge phase-shift oscillator, which will produce a clean sine-wave at a frequency well below the picture transmission band (935 cycles per second is employed in a practical embodiment). A signal for measurement purposes is chosen at this frequency to avoid interference with the frequency range of 1200 to 2600 cycles per second employed for transmitting picture information. The choice of a frequency outside the picture transmission band simplifies the problem of separating the measuring signal from the working signal and also makes it possible to employ the transmission measuring system of this invention without interference with normal operation of the telephotograph transmission system.

The pulse amplifier and shaper 122 receives the direct-current pulses generated at the subscriber's transmitter over auxiliary line 123, which is connected to a center tap on the primary of repeater coil 117. Amplifier-shaper 122 has also a ground connection at point 106. The waveform 119 of the signal received on line 123 is seen to be of the same general form as the waveform 108 generated at the pickup coil 105, although some distortion will of necessity be introduced in traversing the loop 115. The pulse amplifier and shaper 122 may be of any well-known design and has for its purpose the amplification of the pulses generated at the subscriber's location and to improve their rise and fall time characteristics. The pulse amplifier and shaper 122 may include, for example, a monostable multivibrator to aid in the production of a sharp rectangular, constant-width output pulse, as shown in waveform 126. A pulse of about 25 milliseconds' width centered in the available clamp-bar interval is used in a practical system to insure that no interference with the picture signal results.

The output wave 124 of the sine-wave generator 121 is applied to one input of the modulator 125 by way of leads 128, and the output of pulse amplifier and shaper 122 is applied to another input of the modulator 125 by way of leads 127. Modulator 125 may be a simple gating arrangement whereby a burst of 935-cycle tone is transmitted to its output whenever it is enabled by a pulse from amplifier-shaper 122.

A four-wave four-way bridge circuit 133 is also provided at the west central office for the purpose of allowing through transmission of picture signal information from input lines 135 to ouput lines 132, and also to allow through transmission in the opposite direction of received picture information from input lines 141 to output lines 136. In the usual bridge circuit an input on one leg is connected to three output legs, but blocked from the remaining legs. At the same time the tone burst output of modulator 125 is connected to bridge 133 by way of lines 129. In the bridge 133 the tone burst output is combined with the picture signal and is transmitted over the line 132 to the east central office, for example. The shape of the burst signal on line 129 is shown in waveform 130. The shape of the picture signal alone is shown generally in waveform 134. The combined burst and picture signal which appears on line 132 is shown in waveform 131. Resistors 137 and 139 terminate unused legs of bridge 133.

The combined signal incoming on line 132 to the east central office is delivered first to four-wire four-way bridge 233 and thence to the transmission measuring set 240 by way of line 242. The four-wire four-way bridge 233 is similar in construction to bridge 133 at the west central office. The transmission measuring set will be described in more detail below.

In a way similar to that just described for the west central office, a tone burst can be generated and transmitted from the east central office over the transmission line 141 to the west central office. At the west central office the received tone burst signal is measured on transmission measuring set 140.

A signal generator 220 may be installed at the east central office in order to practice this invention. The signal generator includes sine-wave generator 221, having an output waveform 224, and feeds modulator 225 over line 228. Modulator 225 also receives pulse 219 on lines 223 and 227 as amplified by pulse amplifier and shaper 222. The input to modulator 225 is shown in waveform 226 and the output, in waveform 230.

Four-way bridge 233 is the same as bridge 133 in Fig. 1 and includes input lines 235 from repeating coil 217, 132 from the west central office, and 229 from signal generator 220. Bridge 233 also includes output lines 236 to the east subscriber, 242 to the transmission measuring set 240 for waveform 243, and 141 for composite waveform 231 to the west central office. Unused legs are terminated by resistors 237 and 239.

Transmission measuring set 240 is identical to measuring set 140 in Fig. 1, as described below.

Transmission measuring sets 140 and 240 are shown in more detail in Fig. 3. The four-way bridge shown in Fig. 3 may represent either the four-way bridge 133 at the west central office or bridge 233 at the east central office. This bridge is so designed that an incoming signal on line 141 is directed to outgoing line 136, termination 137, and to line 142 connected to the transmission measuring set. The general shape of a combined burst and picture signal is shown as waveform 143 in Fig. 3. The transmission measuring set may comprise in its simplest form a tuned amplifier 301 or an untuned amplifier and a bandpass filter for separating the burst signal from the picture signal, and a peak-reading electron tube voltmeter 317. However, a transmission measuring set of this simplicity would produce merely an average reading over a succession of burst signals. The order to obtain a voltmeter reading of each individual burst signal a more elaborate transmission measuring system is employed. Therefore, in addition to the tuned amplifier 301 and the peak-reading voltmeter 317 the more complex transmission measuring circuit includes an arrangement for resetting the voltmeter after the amplitude of each burst has been measured, so that the meter always indicates the amplitude of the last burst incident thereat.

The output of amplifier 301 is split into two paths over lines 302 and 303. The signal 318 appearing on line 302 is applied directly to the measuring input of the peak-reading voltmeter 317. However, the signal 304 appearing on line 303 is first applied to a squarer 305 which regenerates each cycle of the burst pulse train into square wave pulses of constant amplitude. Thus, the output of the squarer 305 appearing on line 306 consists of a constant amplitude square wave pulse train having a fundamental frequency of 935 cycles per second and a duration essentially equal to the original pulse width of about 25 milliseconds. Waveform 307 illustrates the general form of the output of the squarer 305. The squared signal on line 306 is then integrated in integrator 308 in a capacitor-resistor network, for example, to produce on the output line 309 a waveform of the shape shown generally in waveform 310. The leading edge of the integrated waveform 310 is next differentiated in a differentiator 311, which comprises a further capacitor-resistor network, to produce a sharp positive spike output on line 312. The positive spike output waveform 313 of differentiator 311 is next inverted in an inverter 314 to produce the sharp negative spike output shown in waveform 316. Inverter 314 may be of any well-known type. The sharp negative spike output of inverter 314 is applied by way of line 315 to an auxiliary input of the peak-reading voltmeter 317 in such a way as to discharge the peak storage capacitor therein. Waveform 319 represents the composite voltage effective across the storage capacitor of the voltmeter. The steep leading edge results from the rapid discharge of the capacitor caused by the application of negative spike 316 and the slow build-up results from the application of the tone burst signal thereto.

This unique arrangement of causing the electron tube voltmeter to produce a fresh reading for each tone burst makes it possible to avoid a cumulative error in the reading of the voltmeter. A more detailed description of the operation of the transmission measuring set is given in a copending application of one of us, T. F. Benewicz, Serial No. 781,399, filed of even date herewith.

In order to obtain a permanent record of transmission net loss variations, a graphic recorder such as that designated 321 in Fig. 3 may be used in conjunction with the peak-reading vacuum tube voltmeter. With the graphic recorder a strip chart with a timing index may be obtained for more precise determination of transmission net loss variations.

It is apparent from Figs. 1 and 2 that with the measuring system of this invention a certain economy of equipment use can be obtained by providing a signal generator only at offices from which the heaviest customer traffic originates. At the same time from Fig. 3 it is seen that transmission measuring sets may be provided also at as many intermediate stations as are desired and the same transmitted signal may be monitored at each of these intermediate stations. It thus becomes possible to detect the particular transmission link which is responsible for any transmission irregularities.

A further economy of equipment may be effected in that all subscribers served by a particular central office need not be provided with pulse generating apparatus. Although private line telephotograph customers are not generally switched at the central office, several customers may be bridged to the line for simultaneous reception of the same pictorial subject matter by the use of four-way four-wire bridges in tandem. It will suffice to modify only the heaviest user of line time at each central office with the necessary pulse generating apparatus.

It is further apparent from Figs. 1 and 2 that the transmission measuring set at the central office from which a measuring tone is being transmitted may be used to monitor the output level of the signal generator in the same office. This is due to the mode of operation of the four-way bridge.

While this invention has been described with reference to a particular optical type of facsimile or telephotograph transmission system, it will be apparent to those skilled in the art that it is equally applicable to the making of transmission measurements on other types of facsimile systems. For example, and not by way of limitation, the controlled tone burst signal may be used as a pilot frequency for automatically regulating transmission level.

What is claimed is:

1. An arrangement for measuring transmission loss in a telephotographic transmission system in which pictorial subject matter is scanned line by line at the transmitter and in which there exists a vacant time interval in each scanning line comprising means at the transmitter for generating a pulse coincident in time with said vacant time interval, a sinusoidal wave generator operating at a fixed frequency outside the range in which said pictorial subject matter is transmitted, means for gating the output of said generator wtih the output of said pulse generating means, means for transmitting the gated wave output of said gating means over said system together with a signal containing said pictorial matter, filter means at the output of said system for separating said gated wave from the pictorial information signal, and means for measuring the amplitude of said gated wave as a measure of said transmission loss.

2. In combination, a system for transmitting and receiving pictorial information on a line-by-line scanning basis in a particular frequency range, means for inserting at the end of each of said lines a burst of tone at a predetermined frequency outside said particular frequency range at the transmitting end of said system, means for presetting said tone burst to a known level, means for separating said tone burst from said pictorial information at the receiving end of said system, and means for measuring the amplitude of said tone burst as an indication of the transmission efficiency of said system.

3. Testing apparatus for measuring transmission level in a system for transmitting line by line in a certain frequency band picture information from any one of a plurality of subscriber locations served by a central office over a transmission line to a distant point comprising at one of said subscriber locations means for generating a direct-current pulse in the interval between lines of said picture, a subscriber loop linking said subscriber location and said central office, means at said central office for generating a sine-wave at a frequency outside said certain frequency band, means for intermodulating said pulse after transmission over said loop with said sine-wave to produce a gated sine-wave signal at a preselected transmission level, means for applying a composite signal representative of said picture information and said gated signal to said transmission line at said central office, a low-pass filter connected at said distant point for separating said gated signal from said picture information, and a peak-reading voltmeter connected to the output of said filter for measuring the level of the received gated signal thereat.

4. The testing apparatus according to claim 3, an intermediate point on said transmission line between said central office and said distant point, and an additional low-pass filter and voltmeter connected at said intermediate point for separating said gated signal from said picture information and measuring the level of said gated signal thereat.

5. The testing apparatus defined in claim 3 in which said subscriber loop includes a simplex arrangement for transmitting said pulse from said one subscriber location to said central office comprising at each end of said subscriber loop a center-tapped repeating coil, a connection at the center tap at said one subscriber location to said pulse generating means, and a further connection at the center tap at said central office to said intermodulating means.

References Cited in the file of this patent

UNITED STATES PATENTS

| | | |
|---|---|---|
| 1,913,496 | Matte | June 13, 1933 |
| 2,842,617 | Turkheimer | July 8, 1958 |
| 2,843,658 | Christian | July 15, 1958 |